United States Patent
Park et al.

(10) Patent No.: US 12,337,651 B2
(45) Date of Patent: Jun. 24, 2025

(54) INTEGRATED APPARATUS FOR MEASURING INTERIOR TEMPERATURE AND DUST OF VEHICLE

(71) Applicants: Hyundai Motor Company, Seoul (KR); Kia Corporation, Seoul (KR); Hanon Systems, Daejeon (KR); One Gene Electronics CO., LTD, Hwaseong-si (KR)

(72) Inventors: Ji Min Park, Suwon-Si (KR); Yong Chul Kim, Hwaseong-Si (KR); Yong Sub Kim, Hwaseong-Si (KR); Jae Ha Kim, Yongin-Si (KR); Gyun Ho Gim, Suwon-Si (KR); Young Min Kim, Daejeon (KR); Sang Ho Oh, Daejeon (KR); Chae Geun Lim, Daejeon (KR)

(73) Assignees: Hyundai Motor Company, Seoul (KR); Kia Corporation, Seoul (KR); Hanon Systems, Daejeon (KR); One Gene Electronics CO., LTD, Hwaseong-si (KR)

( * ) Notice: Subject to any disclaimer, the term of this patent is extended or adjusted under 35 U.S.C. 154(b) by 268 days.

(21) Appl. No.: 17/963,828

(22) Filed: Oct. 11, 2022

(65) Prior Publication Data

US 2023/0140429 A1    May 4, 2023

(30) Foreign Application Priority Data

Nov. 1, 2021    (KR) .................. 10-2021-0148058

(51) Int. Cl.
*B60H 1/00*    (2006.01)
*G01K 13/024*    (2021.01)
*G01N 15/06*    (2024.01)

(52) U.S. Cl.
CPC ....... *B60H 1/00585* (2013.01); *G01K 13/024* (2021.01); *G01N 15/06* (2013.01)

(58) Field of Classification Search
CPC .......................... B60H 1/00585; B60H 1/008; B60H 1/00792; B60H 1/0807; G01K 13/024;
(Continued)

(56) References Cited

U.S. PATENT DOCUMENTS 4,662,758 A * 5/1987 Fukui .................. G01N 21/534
356/439
5,377,528 A    1/1995 Dauvergne
(Continued)

FOREIGN PATENT DOCUMENTS

KR    10-1795173 B    11/2017
KR    2019-0108841 A    9/2019
(Continued)

*Primary Examiner* — Marc E Norman
(74) *Attorney, Agent, or Firm* — Morgan, Lewis & Bockius LLP

(57) ABSTRACT

An integrated apparatus of measuring internal temperature and dust of a vehicle includes a main body unit provided with a main flow path including an inlet and an outlet configured to receive air and to discharge air therethrough, a fan motor unit provided in the main body unit and configured to forcibly blow indoor air of the vehicle through the main flow path, a temperature measuring unit configured to measure the internal temperature through the air drawn into the main flow path, as the fan motor unit is driven, and a dust sensing unit provided with a subsidiary flow path branching off from the main flow path, wherein the dust sensing unit is configured to allow a part of the air drawn into the main flow path to flow in the subsidiary flow path to determine a dust concentration in the air drawn into the subsidiary flow path.

11 Claims, 8 Drawing Sheets

(58) Field of Classification Search
CPC .. G01N 15/06; G01N 15/0211; G01N 15/075; G01N 15/1459; G01N 2015/0096
See application file for complete search history.

(56) References Cited

U.S. PATENT DOCUMENTS

| | | | |
|---|---|---|---|
| 7,971,480 B2* | 7/2011 | Smirnov | G01F 1/6842 |
| | | | 73/202.5 |
| 9,970,856 B2* | 5/2018 | Kwon | G01N 15/1425 |
| 2009/0237261 A1* | 9/2009 | Yokota | G08B 17/10 |
| | | | 340/628 |
| 2017/0158020 A1* | 6/2017 | Park | G01N 21/534 |
| 2022/0291091 A1* | 9/2022 | Van Cauter | G01N 1/2273 |
| 2024/0118183 A1* | 4/2024 | Kim | G01N 15/06 |

FOREIGN PATENT DOCUMENTS

| | | |
|---|---|---|
| KR | 10-2221369 B | 2/2021 |
| KR | 2021-0016965 A | 2/2021 |

\* cited by examiner

[FIG. 1]
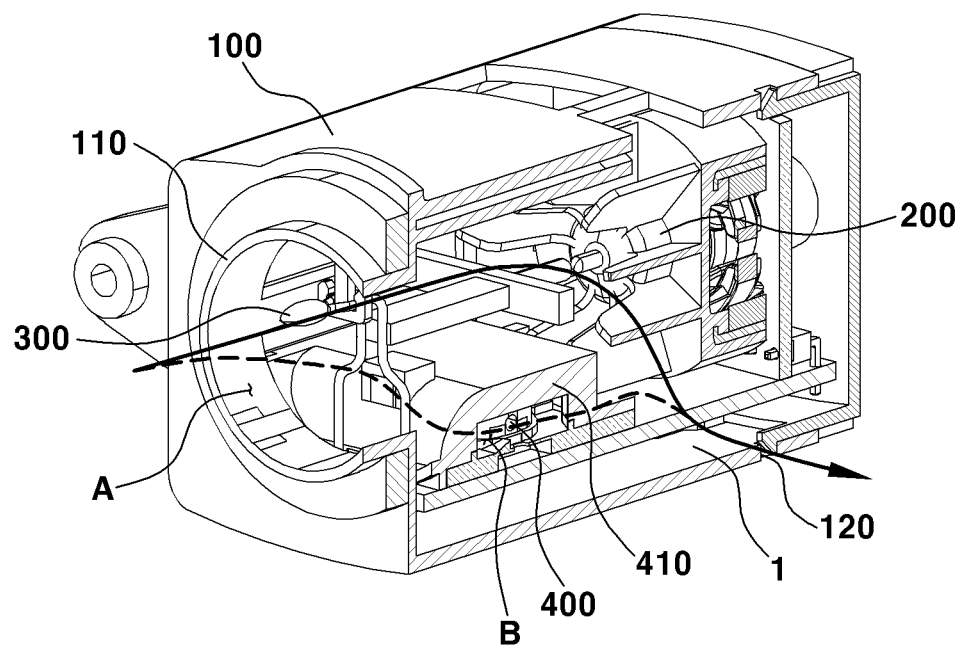

[FIG. 2]
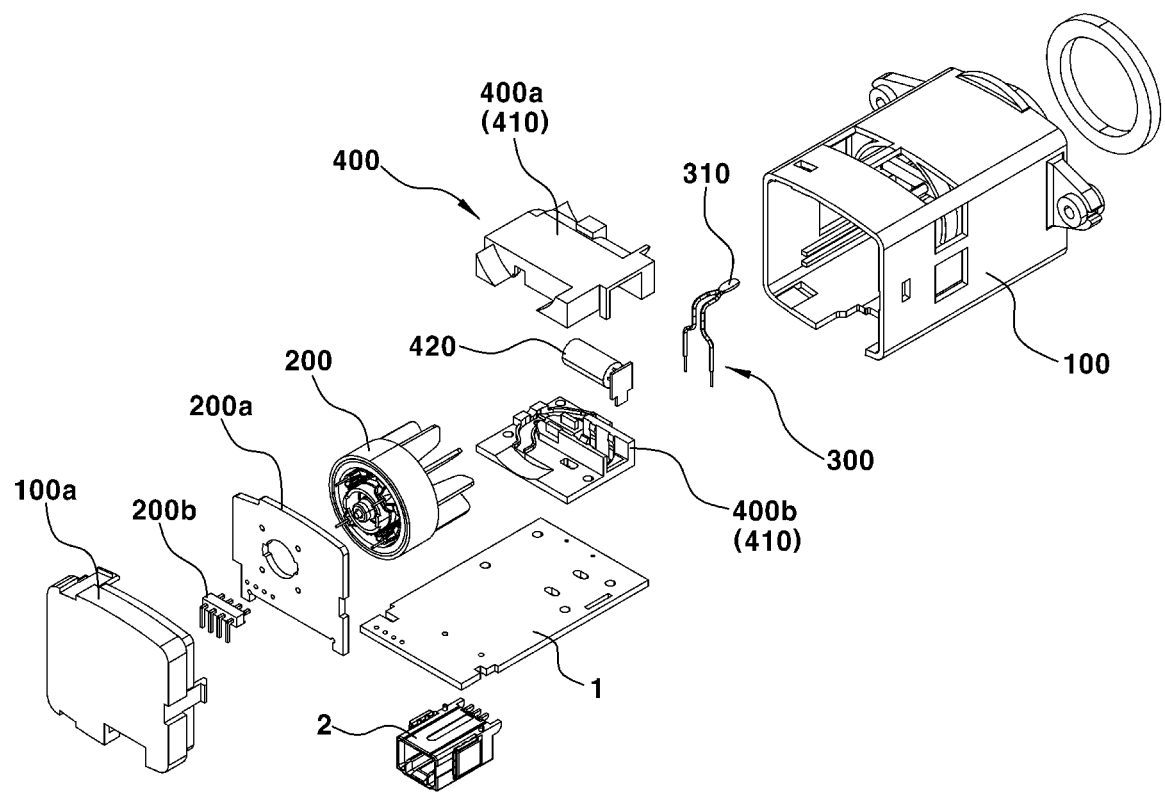

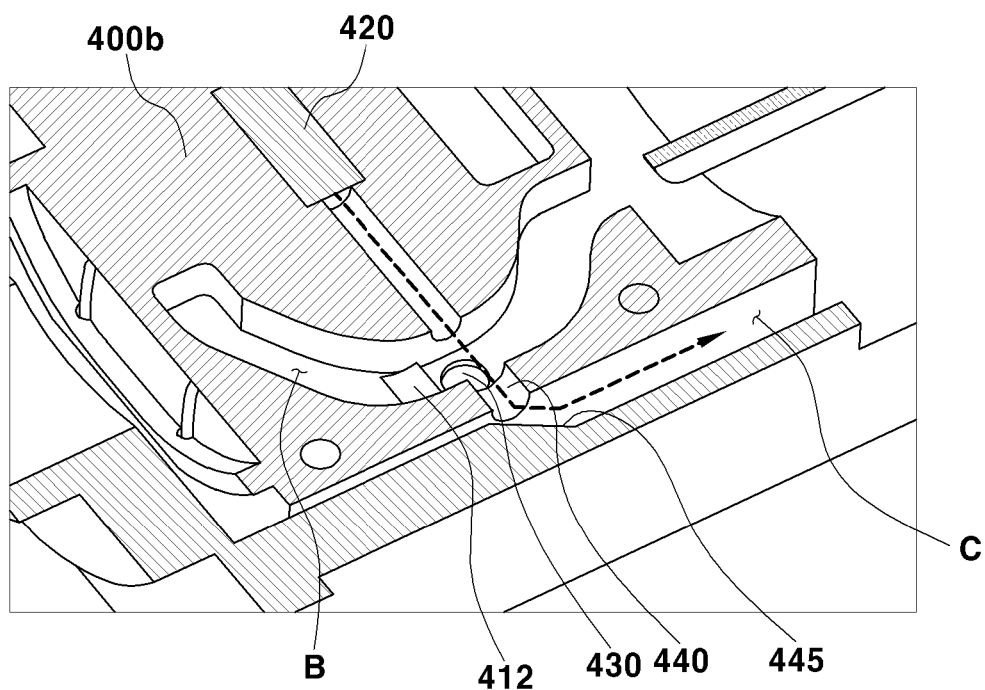
[FIG. 3]

[FIG. 4]
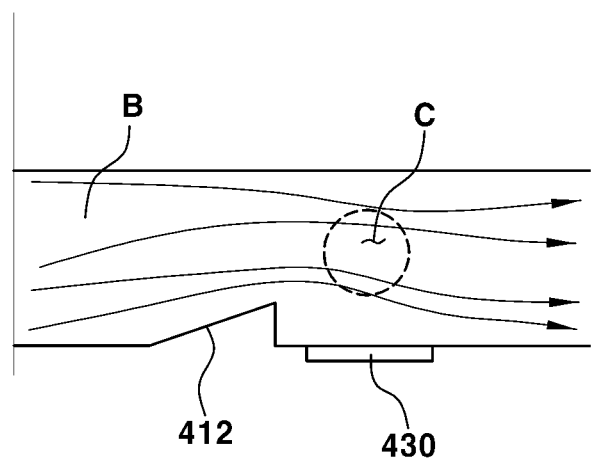

[FIG. 5A]
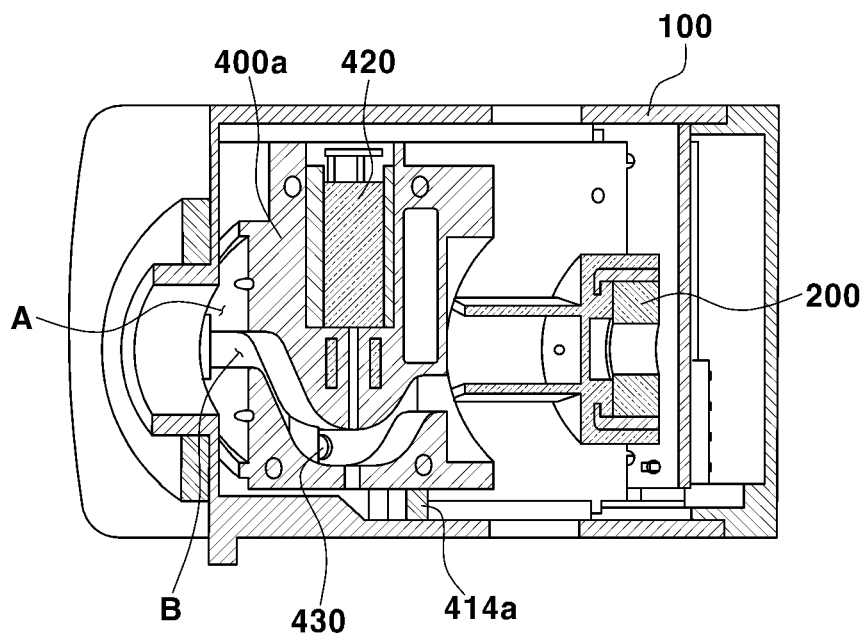

[FIG. 5B]
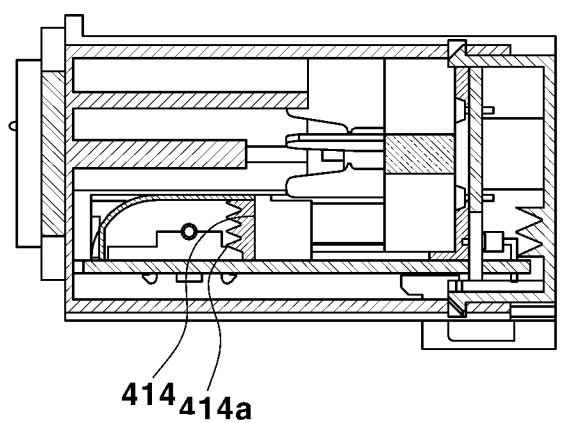

[FIG. 6A]
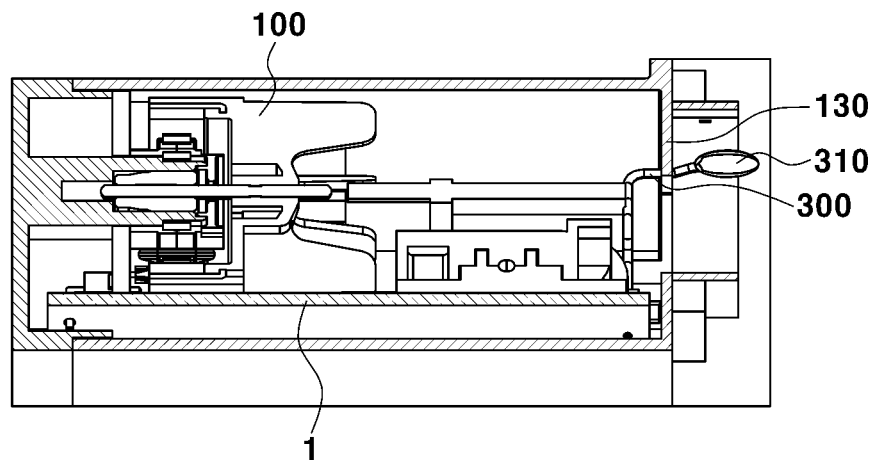

[FIG. 6B]
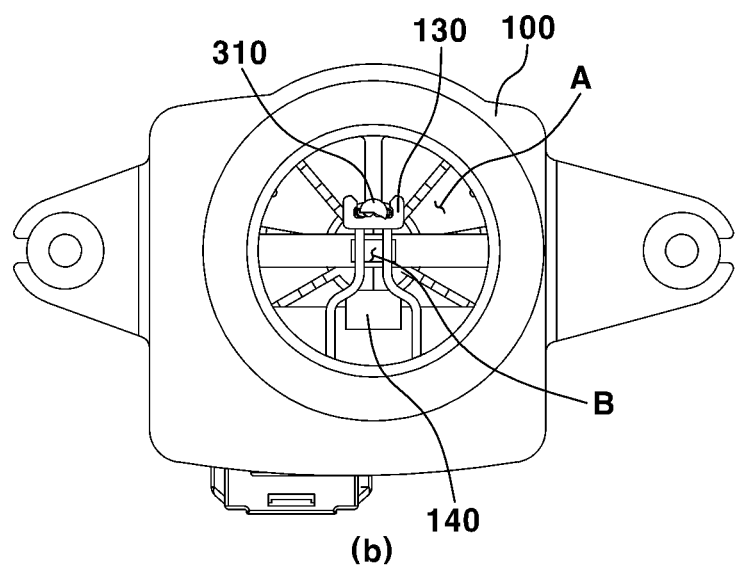
(b)

INTEGRATED APPARATUS FOR MEASURING INTERIOR TEMPERATURE AND DUST OF VEHICLE

CROSS-REFERENCE TO RELATED APPLICATION

The present application claims priority to Korean Patent Application No. 10-2021-0148058 filed on Nov. 1, 2021, the entire contents of which is incorporated herein for all purposes by this reference.

BACKGROUND OF INVENTION

Field of the Present Disclosure

The present disclosure relates to an integrated apparatus for measuring internal temperature and dust of a vehicle. More particularly, it relates to an integrated apparatus for measuring internal temperature and dust of a vehicle, which may integrally detect both the internal temperature and the dust concentration of the vehicle, and may thus reduce assembly labor due to reduction in the number of wires and connectors while reducing component and material costs.

Description of Related Art

In general, to realize the pleasant internal environment of a vehicle, an air conditioner of the vehicle measures the temperature, humidity and dust concentration of the interior of the vehicle, performs cooling or heating of the internal based on the temperature and humidity data, and operates an electrical particulate filter based on the dust data.

Here, as one of methods for confirming the temperature and humidity of the interior of the vehicle, an in-car sensor generates a forcible air flow by drawing in indoor air using a motor provided in the in-car sensor, and measures the temperature and humidity of the interior of the vehicle from the air flow to check the environmental state of the interior of the vehicle.

Furthermore, as interest in dust is rising recently, the dust concentration of the interior of the vehicle is measured to check the state of the interior of the vehicle.

In terms of measurement of the dust concentration, a method for measuring the dust concentration of indoor air drawn in using a motor provided in a dust sensor is used.

The in-car sensor, which is provided on the rear surface of a grill or an instrument panel of the vehicle, intakes indoor air of the vehicle by an aspirator method or an air blowing method, discharges the air to the outside of the vehicle or the interior of the vehicle, and detects the temperature of the indoor air using a temperature sensor provided in the air flow.

The dust sensor, which is also provided on the grill or the instrument panel of the vehicle, intakes indoor air of the vehicle by the aspirator method, and detects a dust concentration (or a dust amount) in the indoor air.

The dust sensor may measure the dust amount by radiating designated light to the drawn indoor air and measuring the amount of light scattered by dust in the air.

The dust sensor may be provided adjacent to, for example, a start button because it is desirable that the dust sensor be provided in a place where there is no wind due to characteristics of the dust sensor, and the in-car sensor may be provided at a position far away from the dust sensor.

The dust sensor and the in-car sensor are individually provided to be provided at positions far away from each other, as described above, and thus, to mount the respective sensors in the vehicle, separate mounting spaces are required, and assembly labor and costs for assembly are increased.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an integrated apparatus of measuring internal temperature and dust of a vehicle, in which an internal temperature sensor and a dust sensor are assembled into one package, and a main flow path configured to detect the internal temperature of the vehicle and a subsidiary flow path configured to detect the dust concentration of the vehicle are separated from each other to satisfy air volumes required by the respective sensors, to secure performance in sensing of the internal temperature and the dust concentration, and to reduce assembly labor due to reduction in the number of wires while reducing material costs.

Various aspects of the present disclosure are directed to providing an integrated apparatus of measuring internal temperature and dust of a vehicle, the integrated apparatus including a main body unit provided with a main flow path including an inlet and an outlet configured to receive air and to discharge air therethrough, a fan motor unit provided in the main body unit and configured to forcibly blow indoor air of the vehicle through the main flow path, a temperature measuring unit configured to measure the internal temperature through the air drawn into the main flow path, as the fan motor unit is driven, and a dust sensing unit provided with a subsidiary flow path branching off from the main flow path, wherein the dust sensing unit is configured to allow a part of the air drawn into the main flow path to flow in the subsidiary flow path to determine a dust concentration in the air drawn into the subsidiary flow path.

In an exemplary embodiment of the present disclosure, exemplary embodiment of the present disclosure, the subsidiary flow path may include an inclined member configured to guide flow of the air drawn into the main flow path along the subsidiary flow path.

In another exemplary embodiment of the present disclosure, the dust sensing unit may include a flow path former configured to form the subsidiary flow path branching off from the main flow path, a light source configured to radiate light to the subsidiary flow path and to induce scattering of the radiated light by dust in the air passing through the subsidiary flow path, and a light receiver provided on a radiation path of the light radiated by the light source and configured to receive light scattered by the dust and to generate a light signal in proportion to an amplitude and a width of a pulse depending on a particle size of the dust.

In yet another exemplary embodiment of the present disclosure, the flow path former may include an inclined member configured to guide flow of the air passing through the subsidiary flow path at a front end portion of the light receiver and to prevent contact of the flowing air with the light receiver.

In yet another exemplary embodiment of the present disclosure, the flow path former may include a barrier member provided at an outlet side of the radiation path and configured to absorb the light radiated by the light source and to prevent inverse scattering of the light.

In still yet another exemplary embodiment of the present disclosure, the barrier member may include a plurality of protruding pieces protruding toward the radiation path.

In a further exemplary embodiment of the present disclosure, the subsidiary flow path may be formed in a "U" shape, a guide member may be provided at a position at which the subsidiary flow path branches off from the main flow path, and an inlet side of the subsidiary flow path connected to inside of the guide member may be bent in an "L" shape.

In another further exemplary embodiment of the present disclosure, the temperature measuring unit may include a temperature sensor configured to measure a temperature of the air drawn into the main flow path, and the temperature sensor may be provided at an inlet side of the main flow path by a mounting guide provided in the main body unit, and is spaced upwards apart from an inlet side of the subsidiary flow path branching off from the main flow path.

In yet another further exemplary embodiment of the present disclosure, the main body unit may be configured so that the temperature measuring unit, the dust sensing unit and the fan motor unit are sequentially provided in a flow direction of the air from the inlet to the outlet in the main body unit.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a perspective view showing an integrated apparatus of measuring internal temperature and dust of a vehicle according to an exemplary embodiment of the present disclosure;

FIG. 2 is an exploded perspective view showing the integrated apparatus according to an exemplary embodiment of the present disclosure;

FIG. 3 is a view showing an inclined member of the integrated apparatus according to an exemplary embodiment of the present disclosure;

FIG. 4 is a view showing the inclined member of the integrated apparatus according to an exemplary embodiment of the present disclosure;

FIG. 5A and FIG. 5B are views showing a barrier member of the integrated apparatus according to an exemplary embodiment of the present disclosure; and FIG. 6A and FIG. 6B are views showing a temperature measuring unit of the integrated apparatus according to various exemplary embodiments of the present disclosure.

It should be understood that the appended drawings are not necessarily to scale, presenting a somewhat simplified representation of various exemplary features illustrative of the basic principles of the present disclosure. The specific design features of the present disclosure as disclosed herein, including, for example, specific dimensions, orientations, locations, and shapes, will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, reference will be made in detail to various embodiments of the present disclosure, examples of which are illustrated in the accompanying drawings and described below. While the present disclosure will be described in conjunction with exemplary embodiments of the present disclosure, it will be understood that the present description is not intended to limit the present disclosure to the exemplary embodiments of the present disclosure. On the other hand, the present disclosure is directed to cover not only the exemplary embodiments of the present disclosure, but also various alternatives, modifications, equivalents and other embodiments, which may be within the spirit and scope of the present disclosure as defined by the appended claims.

Advantages and features of the present disclosure and methods for achieving the same will become apparent from the descriptions of aspects hereinbelow with reference to the accompanying drawings and the embodiments.

However, the present disclosure is not limited to the exemplary embodiments disclosed herein and may be implemented in various different forms. The exemplary embodiments are provided to make the description of the present disclosure thorough and to fully convey the scope of the present disclosure to those skilled in the art. It is to be noted that the scope of the present disclosure is defined only by the claims.

Furthermore, in the following description of the present disclosure, a detailed description of known functions and configurations incorporated herein will be omitted when it may make the subject matter of the present disclosure rather unclear.

FIG. 1 is a perspective view showing an integrated apparatus of measuring internal temperature and dust of a vehicle according to various exemplary embodiments of the present disclosure, FIG. 2 is an exploded perspective view showing the integrated apparatus according to various exemplary embodiments of the present disclosure, and FIG. 3 is a view showing an inclined member of the integrated apparatus according to various exemplary embodiments of the present disclosure.

Furthermore, FIG. 4 is a view showing the inclined member of the integrated apparatus according to various exemplary embodiments of the present disclosure, FIG. 5A and FIG. 5B are views showing a barrier member of the integrated apparatus according to various exemplary embodiments of the present disclosure, and FIG. 6A and FIG. 6B are views showing a temperature measuring unit of the integrated apparatus according to various exemplary embodiments of the present disclosure.

In general, dust indicates fine dust particles having a diameter of 10 μm or less, which float in the air for a long time, and is written as particulate matter (PM) 10, and dust particles having a diameter of 2.5 μm or less are referred to as ultrafine dust, i.e., PM2.5.

Such dust (particularly, ultrafine dust) has ultrafine particles, and may thus deeply permeate into the alveoli through bronchial tubes, being capable of exacerbating respiratory diseases, such as asthma, bronchitis, chronic obstructive pulmonary disease (COPD) and bronchiectasis, and causing atopic dermatitis.

Furthermore, the latest research shows that dust is linked to cancer, cerebrovascular diseases and blood cardiovascular diseases and thus increases the probability of causing diseases directly connected to lives.

Hereinafter, fine dust particles, i.e., PM10, and ultrafine dust particles, i.e., PM2.5, will be referred to as dust, unless it is necessary to distinguish between fine dust and ultrafine dust.

The conventional dust sensor and in-car sensor are provided to be separated from each other by a designated distance on the instrument panel, and in the instant case, the in-car sensor intakes indoor air using a fan motor for in-car sensors, measures an internal temperature using a temperature sensor provided at the inlet of a flow path, and then transmits temperature measuring data to a controller of an air conditioner through a harness connected to a connector.

Furthermore, the dust sensor intakes indoor air using a fan motor for dust sensors, determines a dust concentration through a dust sensor measurement controller when a dust sensor module provided in a flow path outputs an electrical signal in proportion to the intensity (or the amount) of light scattered by dust in the air, and then transmits dust sensing data to the controller of the air conditioner through a harness connected to a connector.

As described above, the conventional in-car sensor and dust sensor provided in the vehicle respectively include the fan motors configured to suction indoor air, and transmit their own sensing data, obtained using their own sensors, to the controller of the air conditioner through the separate harnesses, and thus high costs are taken to measure the internal environment of the vehicle.

Furthermore, when a new product is applied to the interior of the vehicle, it is difficult to secure an installation space in the instrument panel, and the conventional in-car sensor and dust sensor are provided on the instrument panel to be separated from each other, and may thus increase complexity of the instrument panel.

To solve these problems, as shown in FIG. 1 and FIG. 2, an integrated apparatus of measuring internal temperature and dust of a vehicle according to various exemplary embodiments of the present disclosure includes a main body unit 100, a fan motor unit 200, a temperature measuring unit 300 and a dust sensing unit 400.

The main body unit 100 has a designated size to accommodate the fan motor unit 200, the temperature measuring unit 300 and the dust sensing unit 400 therein, and is provided with a main flow path A including an inlet 110 and an outlet 120 configured to receive air and to discharge air to the outside therethrough.

A case 100a configured to protect the inside of the main body unit 100 and a plurality of rubber pads may be coupled to the rear and surfaces of the main body unit 100.

Furthermore, the fan motor unit 200 is selectively operated by a controller connected to a main PCB 1 due to connection of a motor printed circuit board (PCB) 200a to the main PCB1 by a PCB connector 200b, and thus forcibly blows the indoor air of the vehicle through the main flow path A.

Such a single fan motor unit 200, compared to the conventional structure including respective fan motors connected to the temperature measuring unit and the dust sensing unit, may reduce material costs due to reduction in the number of fan motors and the number of connectors, and may achieve unification of mounting spaces and increase in utilization of a vehicle design space due to reduction in the number of wires for connection.

The temperature measuring unit 300 measures the internal temperature through air drawn into the main flow path A as the fan motor unit 200 is driven.

The temperature measuring unit 300 includes a temperature sensor 310 configured to measure the temperature of air drawn into the main flow path A.

That is, the temperature measuring unit 300 transmits a detection signal (for example, the resistance value of a thermistor) from the temperature sensor 310 to the controller, and the controller may measure the temperature of the drawn air based on the received signal.

The temperature sensor 310 is provided at the inlet side of the main flow path A by a mounting guide 130 provided in the main body unit 100 (with reference to FIG. 6A and FIG. 6B), and the temperature sensor 310 may be provided to be spaced upwards apart from the inlet side of a subsidiary flow path B branching off from the main flow path A.

That is to say, the temperature sensor 310 may be provided to be maximally spaced from the main PCB 1 provided in the lower region of the main body unit 100, because heat generated from the main PCB 1 may cause an erroneous detection signal.

Furthermore, the temperature sensor 310 is provided to be spaced upwards apart from the inlet side of the subsidiary flow path B by the mounting guide 130, and may thus perform temperature measurement at the upper end portion of the center portion of the main flow path A at which a wind velocity may be easily secured compared to the upper and lower end portions of the layout of the fan motor unit 200, being configured for securing sensing performance.

The dust sensing unit 400 includes the subsidiary flow path B configured to cause a portion of air drawn into the main flow path A to branch off from the main flow path A, due to coupling between an upper case 400a and a lower case 400b, and determines a dust concentration of the air drawn into the subsidiary flow path B.

Here, because the dust sensing unit 400 requires a low air volume to detect a dust concentration compared to the temperature measuring unit 300, the subsidiary flow path B may branch off from the main flow path A to satisfy such a requirement.

Furthermore, as shown in FIG. 3, the dust sensing unit 400 includes a flow path former 410, a light source 420, and a light receiver 430.

The flow path former 410 is configured to form the subsidiary flow path B branching off from the main flow path A by combining the upper case 400a and the lower case 400b having a designated internal shape, and is formed in a designated shape to form the subsidiary flow path B having a U-shape between the upper case 400a and the lower case 400b on which the light source 420 is provided.

The light source 420 radiates light to the subsidiary flow path B, and thus, causes light scattering due to dust in air passing through the subsidiary flow path B.

The light source 420 may employ light emitting diodes (LEDs), such as infrared LEDs.

The light receiver 430 is provided on the radiation path of light radiated by the light source 420, receives light scattered by dust, and generates a scattered light signal in proportion to the amplitude and width of a pulse depending on the particle size of dust.

The light receiver 430 detects light which is emitted by the light source 430 and is then scattered by dust in air, and may employ, for example, a light receiving sensor which detects incident light.

Information collected by the light source 420 and the light receiver 430 may be transmitted to the controller including the main PCB 1, and more particularly, the controller may determine the concentration of dust by classifying dust particles according to the sizes thereof from the scattered light signal detected by the light receiver 430 and determining the total mass of dust by measuring the number of the dust particles per hour.

In more detail, although not shown in the drawings, the controller may include an analog to digital converter configured to construct a circuit to perform amplification and noise reduction of an electrical signal obtained by detecting the intensity (or the amount) of light scattered by the light receiver 430, to convert the electrical signal into a digital signal and then to output the digital signal, a Local Interconnect Network (LIN) interface configured to perform serial data communication with the air conditioner, and a signal processor configured to control the temperature sensor 310 and a dust sensor including the light source 420 and the light receiver 430 to measure the internal temperature and the dust concentration, and to control the LIN interface to transmit internal temperature and dust concentration data to the air conditioner through a serial digital communication method.

Furthermore, the flow path former 410 may include an inclined member 412 provided at the front end portion of the light receiver 430 and configured to guide the flow path of air passing through the subsidiary flow path B and to prevent contact of the flowing air with the light receiver 430.

The inclined member 412 has a designated inclined plane inclined upwards in the flow direction of air, and accordingly, the flow path of air is changed along the inclined plane to prevent contact of air with the light receiver 430.

That is, because the inclined member 412 is provided close to the front end portion of the light receiver 430, as shown in FIG. 4, the inclined member 412 guides the air flow including dust along the inclined plane, being configured for preventing dust from accumulating on the lens of the light receiver 430 due to direct contact between dust and the light receiver 430, and thus being configured for securing reliability in dust sensing performance.

Furthermore, the flow path former 410 includes a barrier member 414 provided at the outlet side of the radiation path of light and configured to absorb light radiated by the light source 420 and to prevent inverse scattering of light, as shown in FIG. 5A.

In determination of the dust concentration by inducing scattering of light radiated by the light source 420 by dust particles in air passing through the subsidiary flow path B, when the radiated light is reflected and thus returns to the subsidiary flow path B, accuracy in determination of the dust concentration may be lowered due to inverse scattering of light.

Therefore, the barrier member 414 has a structure which absorbs light at the outlet side C (with reference to FIG. 3) of the radiation path, being configured for preventing inverse scattering of light and thus improving accuracy in determination of the dust concentration.

The barrier member 414 may have a structure which may effectively absorb radiated light, and may have a structure including a plurality of protruding pieces 414a configured to protrude toward the radiation path, as shown in FIG. 5B.

The subsidiary flow path B may be formed in a "U" shape, a guide member 140 may be provided at a position at which the subsidiary flow path B branches off from the main flow path A (with reference to FIG. 6B), and thus, the inlet side of the subsidiary flow path B connected to the inside of the guide member 140 may be bent in an "L" shape.

That is, the guide member 140 is configured to prevent the internal region of the subsidiary flow path B other than the inlet side thereof from being exposed to the outside, and subsequently, the subsidiary flow path B is bent from the inlet side thereof in the "L" shape.

Through such a structure, the inside of the subsidiary flow path B is primarily isolated from the outside thereof by the guide member 140, and inflow of a portion of light to the inside of the subsidiary flow path B due to solar radiation is secondarily prevented by the streamlined shape, i.e., the "U" shape of the subsidiary flow path B (with reference to FIG. 3), being configured for improving dust sensing performance.

In an exemplary embodiment of the present disclosure, a light outlet hole 440 is formed at a bottom of U-shaped subsidiary flow path B and the light of the light source 420 radiate through the light outlet hole 440, passing over the light receiver 430.

In an exemplary embodiment of the present disclosure, a reflection surface 445 which is inclined with a predetermined angle is formed so that the light of the light source 420 passing through the light outlet hole 440 is reflected outside.

Various aspects of the present disclosure are directed to providing an integrated apparatus of measuring internal temperature and dust of a vehicle, in which an internal temperature sensor and a dust sensor are assembled into one package, and a main flow path configured to detect the internal temperature of the vehicle and a subsidiary flow path configured to detect the dust concentration of the vehicle are separated from each other to satisfy air volumes required by the respective sensors and thus to secure performance in sensing of the internal temperature and the dust concentration.

Therefore, the integrated apparatus according to an exemplary embodiment of the present disclosure, which is favorable for the package of the respective sensors, may reduce material costs, may achieve unification of mounting spaces and increase in utilization of a vehicle design space due to reduction in the number of wires, and may reduce assembly labor and a time taken to assemble the integrated apparatus.

Furthermore, the integrated apparatus according to an exemplary embodiment of the present disclosure employs an inclined structure between a laser module and photodiodes configured to detect dust, being configured for preventing dust from accumulating on the photodiodes.

Furthermore, the integrated apparatus according to an exemplary embodiment of the present disclosure primarily blocks inflow of external light using a bending structure at the inlet side of the subsidiary flow path configured to detect dust, and secondarily attenuates a part of external light introduced into the subsidiary flow path using the streamlined structure of the subsidiary flow path, being configured for improving dust sensing performance.

As is apparent from the above description, various aspects of the present disclosure are directed to providing an integrated apparatus of measuring internal temperature and dust of a vehicle, in which an internal temperature sensor and a dust sensor are assembled into one package, and a main flow path configured to detect the internal temperature of the vehicle and a subsidiary flow path configured to detect the dust concentration of the vehicle are separated from each other to satisfy air volumes required by the respective sensors and thus to secure performance in sensing of the internal temperature and the dust concentration.

Therefore, the integrated apparatus according to an exemplary embodiment of the present disclosure, which is favorable for the package of the respective sensors, may reduce material costs, may achieve unification of mounting spaces and increase in utilization of a vehicle design space due to reduction in the number of wires, and may reduce assembly labor and a time taken to assemble the integrated apparatus.

Furthermore, the integrated apparatus according to an exemplary embodiment of the present disclosure employs an inclined structure between a laser module and photodiodes configured to detect dust, being configured for preventing dust from accumulating on the photodiodes.

Furthermore, the integrated apparatus according to an exemplary embodiment of the present disclosure primarily blocks inflow of external light using a bending structure at the inlet side of the subsidiary flow path configured to detect dust, and secondarily attenuates a part of external light introduced into the subsidiary flow path using the streamlined structure of the subsidiary flow path, being configured for improving dust sensing performance.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An integrated apparatus for measuring internal temperature and dust of a vehicle, the integrated apparatus comprising:
   a main body provided with a main flow path including an inlet and an outlet to receive air through the inlet and to discharge the air through the outlet;
   a fan motor provided in the main body and configured to forcibly blow indoor air of the vehicle through the main flow path;
   a temperature sensor configured to measure the internal temperature through the air drawn into the main flow path, as the fan motor is driven; and
   a dust sensor provided with a subsidiary flow path branching off from the main flow path, wherein the dust sensor is configured to allow a part of the air drawn into the main flow path to flow in the subsidiary flow path to determine a dust concentration in the air drawn into the subsidiary flow path, wherein the subsidiary flow path is formed in a "U" shape, and wherein a light outlet hole is formed at a bottom of the U-shaped subsidiary flow path and a light of a light source radiates through the light outlet hole, after the light passes over a light receiver.

2. The integrated apparatus of claim 1, wherein the subsidiary flow path includes an inclined member configured to guide flow of the air drawn into the main flow path along the subsidiary flow path.

3. The integrated apparatus of claim 1, wherein the dust sensor includes:
a flow path former configured to form the subsidiary flow path branching off from the main flow path;
the light source configured to radiate the light to the subsidiary flow path and to induce scattering of the radiated light by dust in the air passing through the subsidiary flow path; and
the light receiver provided on a radiation path of the light radiated by the light source and configured to receive light scattered by the dust and to generate a light signal in proportion to an amplitude and a width of a pulse depending on a particle size of the dust.

4. The integrated apparatus of claim 3, wherein the flow path former includes an inclined member configured to guide flow of the air passing through the subsidiary flow path at a front end portion of the light receiver and to prevent contact of the flowing air with the light receiver.

5. The integrated apparatus of claim 3, wherein the flow path former includes a barrier provided at an outlet side of the radiation path and configured to absorb the light radiated by the light source and to prevent inverse scattering of the light.

6. The integrated apparatus of claim 5, wherein the barrier includes a plurality of protruding pieces protruding toward the radiation path.

7. The integrated apparatus of claim 1, wherein a reflection surface inclined with a predetermined angle is formed so that the light of the light source passing through the light outlet hole is reflected outside by the reflection surface.

8. The integrated apparatus of claim 1, wherein a guide member is provided at a position at which the subsidiary flow path branches off from the main flow path, and an inlet side of the subsidiary flow path connected to inside of the guide member is bent in an "L" shape.

9. The integrated apparatus of claim 1,
wherein the temperature sensor includes a sensor configured to measure a temperature of the air drawn into the main flow path.

10. The integrated apparatus of claim 9,
wherein the temperature sensor is provided at an inlet side of the main flow path by a mounting guide provided in the main body, and is spaced upwards apart from an inlet side of the subsidiary flow path branching off from the main flow path.

11. The integrated apparatus of claim 1, wherein the main body is configured so that the temperature sensor, the dust sensor and the fan motor are sequentially provided in a flow direction of the air from the inlet to the outlet in the main body.

* * * * *